United States Patent
Church

(10) Patent No.: US 6,504,132 B1
(45) Date of Patent: Jan. 7, 2003

(54) ELECTRIC ARC WELDER FOR VARIABLE AC INPUT

(75) Inventor: Larry L. Church, Jefferson, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/932,685

(22) Filed: Aug. 20, 2001

Related U.S. Application Data

(60) Provisional application No. 60/229,535, filed on Sep. 5, 2000.

(51) Int. Cl.$^7$ .................................................. B23K 9/10

(52) U.S. Cl. .............................. 219/130.1; 219/130.33; 363/89

(58) Field of Search .......................... 219/130.1, 130.21, 219/130.31, 130.32, 130.33, 137 PS; 363/89

(56) References Cited

U.S. PATENT DOCUMENTS

| | | | |
|---|---|---|---|
| 4,677,366 A | | 6/1987 | Wilkinson et al. |
| 5,149,933 A | | 9/1992 | Donner |
| 5,786,992 A | | 7/1998 | Vinciarelli et al. |
| 5,864,110 A | | 1/1999 | Moriguchi et al. |
| 5,917,711 A | | 6/1999 | Shikata et al. |
| 5,991,169 A | | 11/1999 | Kooken |
| 6,023,037 A | | 2/2000 | Church et al. |
| 6,091,612 A | | 7/2000 | Blankenship |
| 6,115,273 A | * | 9/2000 | Geissler ........................ 363/89 |
| 2001/0042739 A1 | * | 11/2001 | Mela ........................ 219/130.1 |

OTHER PUBLICATIONS

Wei, Batarseh, Zhu and Kornetzky, *A Single–Switch AC–DC Converter with Power Factor Correction*, vol. 15, No. 3, May 2000.

* cited by examiner

*Primary Examiner*—Clifford C. Shaw
(74) *Attorney, Agent, or Firm*—Fay, Sharpe, Fagan, Minnich & McKee

(57) ABSTRACT

An electric arc welder with a variable AC voltage input of up to 600 VAC and a rectifier to provide a DC link, a driven high frequency boost stage with first and second leads connected to the DC link. The boost stage comprises an inductor, a first series output branch with a first primary winding connected to the first lead and a first capacitor connected to the second lead, a second series output branch with a second primary winding connected to the second lead and a second capacitor connected to the first lead and a high frequency operated switch between the leads and having an opened condition charging said capacitors by current through the primary windings in a first direction and discharging the inductor and a closed condition charging the inductor through the primary windings by current in a second direction and discharging the inductor to charge the capacitors. The switch is operated by a power factor control circuit at a frequency greater than about 18 kHz. The boost stage has an AC output stage comprising the secondary winding network of a transformer powered by current flow in the first and second primary windings. An output rectifier converts said AC output to a first DC voltage. At the final portion of the welder an output converter converts the first DC voltage to a second DC voltage connected across the arc of a welding station and having a controlled weld current or voltage.

45 Claims, 3 Drawing Sheets

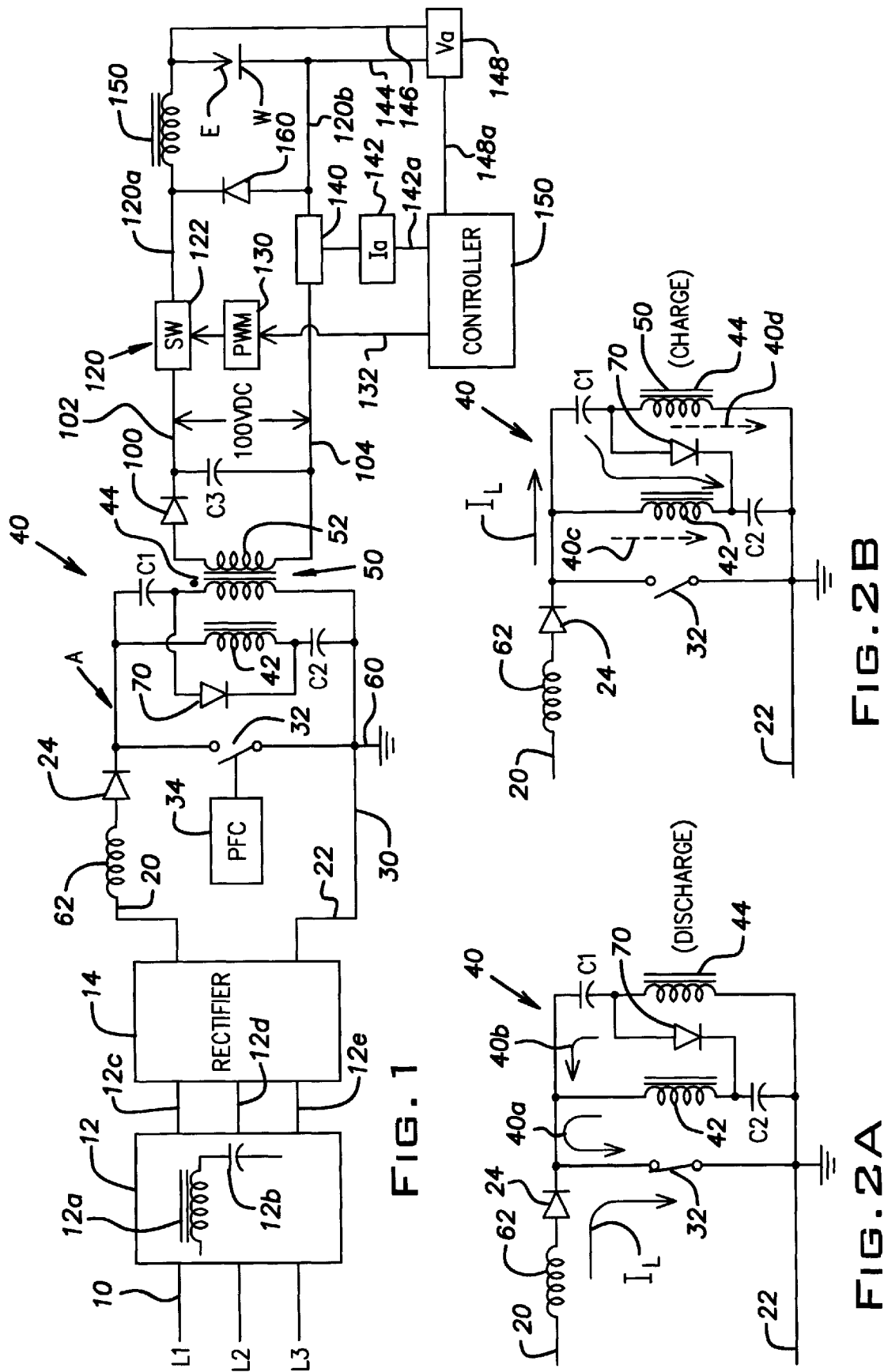

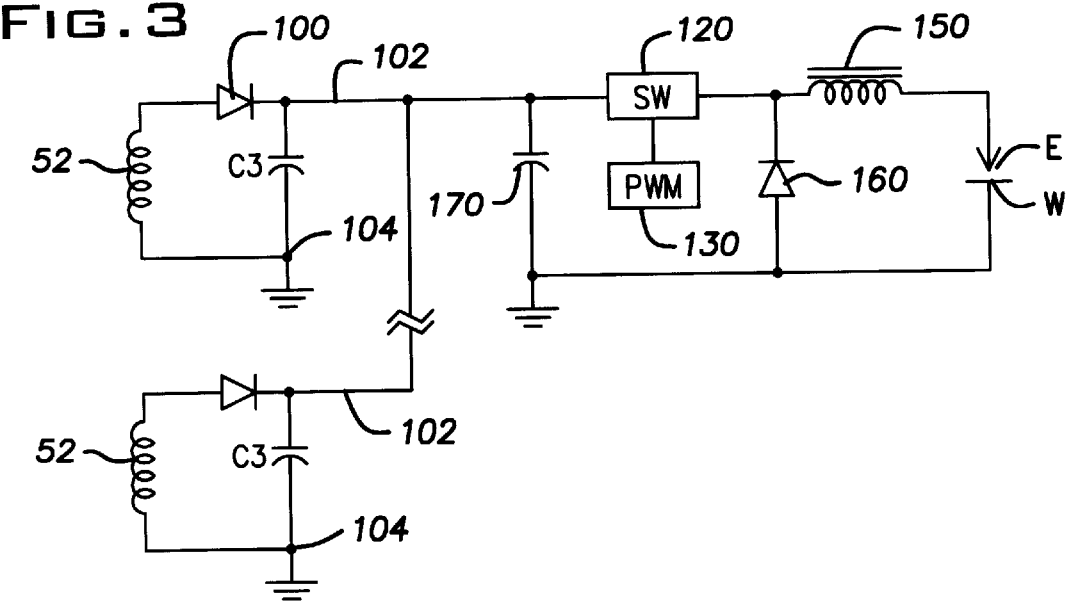
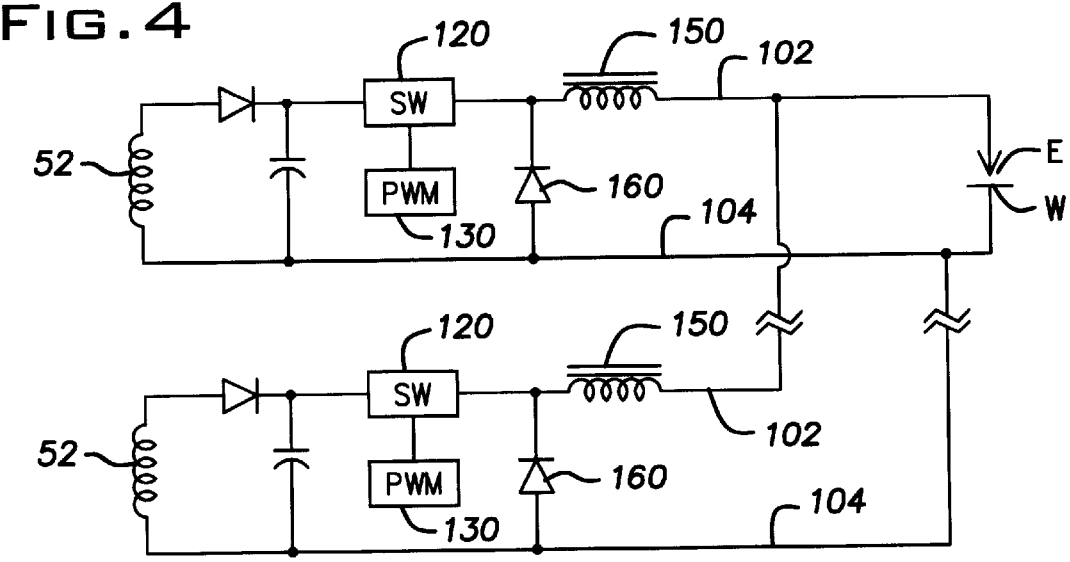

ELECTRIC ARC WELDER FOR VARIABLE AC INPUT

This application claims the benefit of copending provisional application Ser. No. 60/229,535 filed Sep. 5, 2000.

The invention relates to the art of electric arc welding and more particularly to an electric arc welder having a controlled voltage or current output with the variable or universal AC input that ranges up to about 600 VAC.

INCORPORATION BY REFERENCE

The invention relates to a unique electric arc welder having a dual intermediate stage operated by a power factor control chip whereby a unique architecture allows the input to vary drastically up to 600 volts while the controlled output weld current and/or weld voltage is controlled in the DC welding range. By utilizing the unique architecture of the power factor control dual intermediate stage in combination with an output converter, the power supply for the electric arc welder can have high input voltage variable in magnitude with an output power exceeding two to three kilowatts. Since there are several topographies relating to this type of power supply for use in low rated appliances, several items of prior art are incorporated by reference herein as background information for evaluating uniqueness and superiority of the present invention. The invention relates to power factor correcting power supplies capable of producing a high power rating needed for welding. This feature requires consideration of welding prior art also.

For some time, it has been known to use a boost type power factor correction with an electronic switch controlled by a power factor correcting circuit in the form of a chip. An early version of this architecture is shown in Wilkinson U.S. Pat. No. 4,677,366 which is incorporated by reference for background information. This early power supply does not use the novel architecture of the present invention and can be used for only low power applications.

In Donner U.S. Pat. No. 5,149,933 a boost converter uses a high speed operated switch that can be operated by a power factor controller circuit No. ML 4812 made by Micro-Linear Corporation. This circuit provides a current to a charging capacitor bank throughout the full 180° of each half cycle of the fill wave rectified line voltage. The power factor control chip uses a transformer to apply output energy to the weld operation. This patent appears to be an early laboratory type single phase power supply with a power factor correcting circuit allegedly capable of welding. Current and voltage feedback 1 allegedly controls the pulse generator that operates the switch when there is no power factor control feature used in this early laboratory power supply. This patent discloses background information of an early attempt to use power factor control in a welding installation. Donner U.S. Pat. No. 5,149,933 is incorporated by reference herein as background information only. There is no dual stage inverter, nor output converter.

Since the present invention relates to an architecture wherein a boost converter, albeit a dual stage, drives a DC to DC output converter, Vinciarelli U.S. Pat. No. 5,786,992 is relevant because it shows a related low voltage circuit of this type used for lighting installations. The power factor control is discontinuous whereby input current does not flow at all times. The output power is very limited and the input voltage is fixed at commercial line voltage. This patent does not relates to welding or any other high power technology. However, the patent is incorporated by reference herein merely to show a boost converter for driving a transformer that powers a DC to DC converter using a standard power factor correcting circuit. Such low voltage power factor control circuit for fixed AC input with input voltage less than 220 volts and power ratings less than about 50 watts are somewhat standard at least in the patented technology, but not in practice. Another low power boost circuit with power factor control capabilities is shown in Shikata U.S. Pat. No. 5,917,711 also incorporated by reference. This patent illustrates a boost converter for power factor correction with an output circuit driven by a transformer. The power factor circuit utilizes the input current wave form. This prior low rated power supply can not be used for welding. Turning now to welding power supplies, a power supply circuit having a power factor correcting feature with an output transformer to drive a welding circuit is shown in Moriguchi U.S. Pat. No. 5,864,110. This power supply is used for arc welding; however, it does not have an output stage which allows utilization of a standard DC link that is converted to the necessary welding current and voltage. This patent is incorporated by reference herein.

The Lincoln Electric Company has issued United States patent relating to the use of power factor correcting circuits in various architecture used for electric arc welding. These patents are Kooken U.S. Pat. No. 5,991,169, Church U.S. Pat. No. 6,023,037 and Blankenship U.S. Pat. No. 6,091,612. Each of these power supplies includes power factor correcting feature; however, they do not use the unique architecture for delivery of AC voltage that is converted to a DC link to be converted to low voltage DC use in arc welding. The patents by Lincoln Electric are incorporated by reference herein as background information in that they relate to welding power supplies, but not the architecture of the present invention.

The low power supply circuits constituting the above background information can not be used for welding. Further, those patents incorporated by reference herein that disclose prior attempts to resolve problems associated with electric arc welding use architecture quite different than used in practicing the present invention. All of this background information discloses a body of technology need not be repeated. The specific architecture of the present invention and the novelty thereof is set forth in this disclosure build on or replaces such prior efforts.

The invention utilizes a dual stage boost inverter circuit with power factor correcting capabilities similar to the circuit shown in an article by Wei Batarseh, and Zhu in an article entitled *A Single-Switch AC/DC converter with Power Factor Correction*, dated May 2000. This IEEE article is incorporated by reference herein as background information to explain the operation of the inverter concept for creating the AC output with a controlled power factor for the input. This laboratory type power supply can not be used for welding. The input is less than 220 volts and the power rating is considerably less than 50 watts. This article is incorporated by reference herein as background information.

BACKGROUND OF INVENTION

As indicated by the several prior art patents constituting background, a substantial amount of effort was devoted in the 1980's to develop a power supply for high volume domestic industrial appliances that could be connected to a single phase line voltage and maintain a high power factor or low harmonic distortion. This extensive research and development endeavor was intensified by the need to increase the efficiency and thus reduce the electrical power consumed in large volume by small domestic appliances throughout the nation. These power supplies were designed to use a boost converter, buck converter or flyback converter with specially designed power factor correcting chips using controlled switching of the converter to assure high input power factors and low harmonic distortion. These small power supplies normally created less than 2000 watts of power and were not usable for industrial applications. In the mid 1990's, the electric arc welding industry was using inverter type power supplies with high switching frequency; however, power factor correcting technology for such power supplies did not exist. Consequently, electric arc welders presented a problem with power consumption. There were no techniques to control the power factor of the input lines driving electric arc welders. This was even more pronounced with input that could be as high as 600 VAC.

In the mid 1990's, a few of the companies in the electric arc welding field started experimenting with modifying power factor control power supplies to create a high capacity power supply for welding and plasma cutting. Then, it was realized that merely converting existing power supplies to welding power supplies was not the proper development direction. Thus, The Lincoln Electric Company of Cleveland, Ohio took a different tack. Power supplies were tailored for welding. At first such efforts involved only an attempt to use low power units for high power welding. This was not commercially successful. This effort has resulted in several patents by The Lincoln Electric Company, such as Kooken U.S. Pat. No. 5,991,169, Church U.S. Pat. No. 6,023,037 and Blankenship U.S. Pat. No. 6,091,612 all of which disclose special power supplies with the inverter stages with a power factor correcting feature having the ability to create a high output power for electric arc welding. These patents disclose switching power supplies with specific inverter topographies with output chopper stages in most instances. All of these prior efforts to provide electric arc welders with specially developed power supplies having power factor correcting capabilities presented certain functional limitations. Consequently, it was desirable to develop a new architecture which could be driven by high voltage input power up to approximately 600 VAC while having a controlled output of welding voltage in the range of 20–100 VDC. To combine these two completely different, diverse electrical voltage concepts, there was a need to develop a specific architecture for accomplishing this objective while still maintaining high power factor and low harmonic distortion.

THE INVENTION

The requirements of electric arc welding capable of converting single or three phase high voltage electrical input to a low voltage DC, with high output power for electric arc welding is accomplished by the present invention. A dual stage boost converter with a power factor correcting circuit controlled by a high speed switch provides a driven inverter network that converts rectified input voltage to an AC output in a manner still maintaining high power factor. By using a driven inverter stage at the output of the power factor correcting boost converter, a specific voltage across an output transformer can produce a low voltage output DC link of approximately 100 VDC. A driven inverter avoids the pitfalls of a resonant inverter. The controlled DC link is then converted by a DC—DC converter in the form of a down chopper to produce the necessary DC voltage for electric arc welding. By using current and voltage feedback the current and voltage for the welding operation is controlled. Of course, a wave shape circuit could be used at the output converter for controlling the wave shape of the current being used for the electric arc welding output.

In accordance with the invention, there is provided an electric arc welder with a variable DC voltage input of up to 600 VAC and a rectifier to provide a DC link with a first and second lead. A driven high frequency boost stage with an inverter output to an isolation transformer gives an AC voltage that is rectified to produce the first DC link. The boost converter has an inverter stage that is operated at a high frequency but still allows high power transfer. The boost stage converter comprises an inductor, a first series output branch with the first primary winding connected to the first lead and a first capacitor connected to the second lead, a second series output branch with a second primary winding connected to the second lead and a second capacitor connected to the first lead and a high frequency operated switch. The switch is connected between the leads and has an open condition charging the capacitor through the primary windings with current flow in a first direction and discharging the inductor and a second condition charging the inductor through the primary winding with current flow in a second direction and discharging the inductor to charge the capacitors. The switch is operated by a power factor control circuit at a frequency greater than about 18 kHz. This boost stage or converter has an AC output comprising the secondary winding network of an isolation transformer powered by the current flow in the first and second primary windings. A rectifier converts the AC output from the transformer to a first DC voltage and a DC/DC converter converts the first DC voltage to a second DC voltage connected across the arc of a welding station. The arc has a controlled weld current or voltage. By this architecture, the input can vary while maintaining a fixed weld voltage.

In accordance with another aspect of the invention, there is a diode poled in the direction from the first lead to the second lead and connected in series between the first and second capacitors to clamp the capacitors as they are charged to a controlled voltage. The switch for charging and discharging the capacitors has a rating of 30–75 amperes which is substantially greater than the low capacity current switches used in the standard power factor connecting power supplies. The first DC voltage is in the control range of 75–113 VDC. Thus, the magnitude and frequency of the arc not input voltage is determining parameters of the output voltage. The first DC link voltage is less than 113 VDC and preferably about 100 VDC. The weld voltage is 20–100 VDC.

In accordance with another aspect of the present invention, the output of the power supply is a buck converter with a switch operated by a pulse width modulator. The pulse width modulator is controlled by a weld current feedback voltage, a weld voltage feedback voltage or combinations thereof. The switch is operated at a frequency in excess of 18 kHz.

The primary object of the present invention is the provision of a high speed switching power supply having power factor correcting capabilities and capable of use in electric arc welding.

Another object of the present invention is the provision of an electric arc welder using the power supply as defined above.

Still a further object of the present invention is the provision of an electric arc welder that has high voltage input capabilities and uses a driven boost and inverter stage.

Another object of the present invention is the provision of a high speed switching circuit power supply for electric arc welding having a power factor correcting circuit and capable of universal input voltage with a controllable weld voltage.

These and other objects and advantages will become apparent from the following description taken together with the accompanying drawings.

BRIEF DESCRIPTION OF DRAWINGS

FIG. 1 is a wiring diagram of the preferred embodiment of the present invention;

FIG. 2A is a partial view of FIG. 1 showing the high speed switch in the closed condition for discharging the capacitor;

FIG. 2B is a view similar to FIG. 1 with the high speed switch in the open condition for charging the capacitor;

FIG. 3 is a schematic wiring diagram of the power supply shown in FIG. 1 with parallel connection of the output stage chopper;

FIG. 4 is a schematic wiring diagram with a parallel connected power supply network having a common connection at the output;

PREFERRED EMBODIMENT

Figure 5:
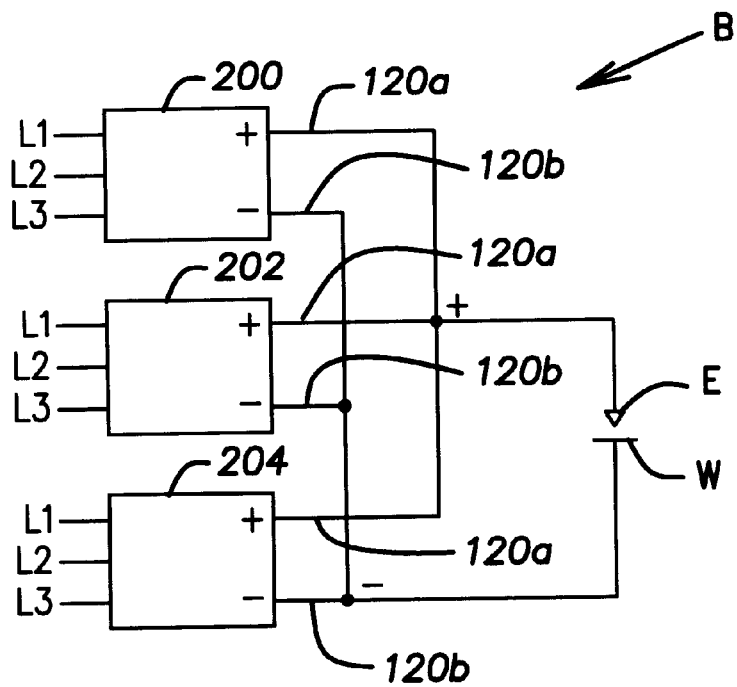
FIG. 5 is a schematic wiring diagram showing three power supplies connected in parallel as shown generally in FIG. 4; and, FIG. 6 is a schematic wiring diagram of three power supplies connected in series to obtain the high current and low voltage for plasma cutting.

Referring now to the drawings wherein the showings are for the purpose of illustrating the preferred embodiment only and not for the purpose of limiting same, FIG. 1 shows a welder A having a universal three phase input 10 through a filter network 12 including an inductance 12a and a series of capacitors 12b with three phase AC filtered voltage on lines 12c, 12d, 12e that is directed to rectifier 14 to create a DC voltage across leads 20, 22. Diode 24 prevents reverse current flow through inductor 62. The voltage across leads 20, 22 and current in these leads is dictated by the variable input voltage in three phase input 10. A boost type power factor correcting stage 30 has an electronic switch 32 controlled by power factor correcting circuit 34. This concept is shown in Wilkinson U.S. Pat. No. 4,677,366. A commercial integrated circuit, such as Unitrode UC 3454 or UC 2852 is used for the power factor correcting circuit. The circuit is selected to cause either continuous current operation or discontinuous current operation of the power factor correction scheme. In practice, chip UC 2852 is employed to provide discontinuous current at the input 10. In this manner, there is no need to commutate the diodes. A single switch 32 can be used. In practice, two parallel connected switches of the IGBT type are used. The current ratings for the switch or switches must be in the area of 30–75 amperes. This use of expensive switches is distinguished from prior attempts to implement the architecture of FIG. 1 with switches having a capacity of no more than 2 amperes. Switches in such prior art efforts cost over 100 times less than switch 32; however, they could not be used in practicing the present invention. Switch 32 is operated at a high frequency of at least 18 kHz to ultimately charge and discharge inductor 62 in a standard boost network. Boost stage 30 is not a standard boost stage since it is a dual stage that includes a high frequency driven output formed in an architecture with two series branches, one of which includes primary 42 in series with capacitor C2 and the other includes primary 44 in series with capacitor C1. These two series branches form the output stage 40 of dual stage 30. Current flows in reverse directions between leads 20, 22. A clamping diode 70 determines the charged voltage of capacitors C1, C2. The natural frequency of the two parallel branches is not used in the present invention since stage 30 with output stage 40 is a driven boost stage where the output frequency is controllable by the frequency of switch 32. Primaries 42, 44 are on the same core of transformer 50 having an output or secondary winding 52. The output stage 40 of boost stage 30 includes the two primaries 42, 44 of transformer 50 that drives secondary or output winding or winding network 52. This network could include two windings similar to primary windings 42, 44.

The operation of output stage 40 of stage 30 is illustrated in FIGS. 2A, 2B. When switch 32 is closed as shown in FIG. 2A, capacitors C1, C2 are discharged as indicated by arrows 40a, 40b. Inductor 62 is charged as indicated by current flow arrow $I_L$. At the end of the switch closed condition, inductor 62 is charged and capacitors C1, C2 are discharged. The switch is then moved to the open condition as shown in FIG. 2A. The current $I_L$ is then used to charge capacitors C1, C2 by current flow shown by arrows 40c, 40d with clamping diode 70 dividing the voltage across capacitor C1, C2. Current flow of arrows 40a, 40b is the opposite to current flow of arrows 40c, 40d. Thus, the input primary side of transformer 50 is an alternating current determined by the switching frequency of switch 32 that is controlled for the purposes of maintaining the high power factor at input stage 10. Transformer 50 is an isolation transformer. The switching frequency of switch 32 is greater than 18 kHz. When the switch is closed, capacitors C1, C2 are charged and when the switch is opened, they are discharged. The secondary winding network which could include two windings 52 produces an AC at the input of rectifier 100. The voltage across leads 102, 104 is in the general range of 100 VDC is applied across capacitor C3. Leads 102, 104 are the input DC link of buck converter 120 for converting the DC across leads 102, 104 into an appropriate output weld voltage and current. DC to DC buck converter 120 has a switch 122 operated by pulse width modulator 130 controlled by the voltage on line 132 from controller 150. This voltage is determined by the sensed current at shunt 140 through detector 142 to produce a feedback voltage in line 142a representing the weld current. The weld voltage across leads 144, 146 is converted by voltage sensing device 148 to produce a voltage in line 148a representing the weld voltage. The weld current and weld voltage are introduced into the controller 150 to set the voltage on line 132 for the input control of pulse width modulator 130. The output of buck converter 120 is the voltage across leads 120a, 120b for driving the output weld station including a choke 150 and a freewheeling diode 160. In this manner, the voltage across electrode E and workpiece W is controlled by the pulse width modulator at a low level for welding, in the general range of 20–80 VDC. By using this unique architecture for the power supply of welder W, variable input voltage at input does not dictate the voltage and current in the weld station as controlled by the voltage across lines 120a, 120b. The unique output stage 40 combined with the boost power factor control circuit on the input side and the DC to DC converter 120 presents an extremely advantageous power supply for welding.

In FIG. 3, the power supply used in FIG. 1 is connected in parallel with a common output chopper similar to the converter shown in FIG. 1. The voltage across lines 102, 104 is maintained by capacitor 170 forming the input to the output chopper. In a similar manner, a common connection to the output is shown in FIG. 4. Two stages of the power supply are connected across leads 102, 104 of two separate power supplies. Of course, any number of power supplies could be connected in parallel as shown in FIGS. 3 and 4.

Figure 6:
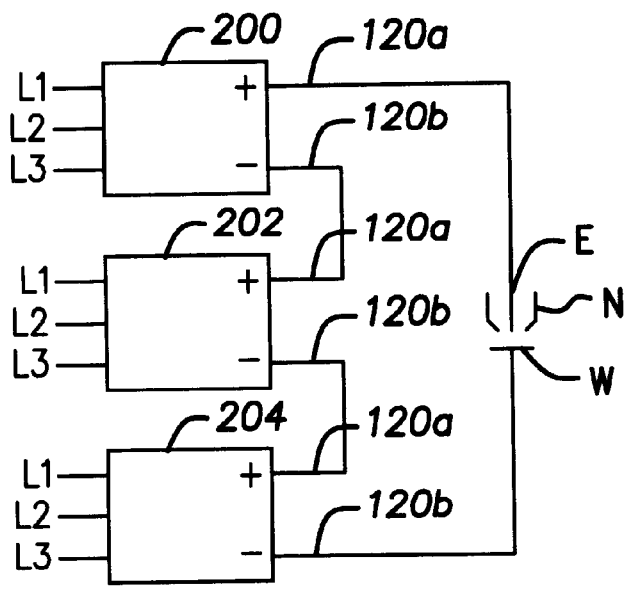

To produce a high current capacity welder, the power supply including filter 12, rectifier 14, stages 30, 40, 120 can each be used as a module to make a welder B as shown in FIG. 5. Modules 200, 202 and 204 each have outputs 120a, 120b which are connected in parallel to produce a high output current capabilities across electrode E and workpiece W. In a like manner, the modules 200, 202, 204 can be connected in series as shown in FIG. 6. This gives a high voltage and low current for plasma cutting using electrode E, nozzle N and workpiece W. Other arrangements are used to combine the power supply shown in FIG. 1 to construct a variety of welders and plasma arc cutters. In this manner, a smaller inventory of power supplies is required. The power supplies can be driven by single phase or three phase input with a universal input rating up to about 600 VAC.

Having thus defined the invention, the following is claimed:

1. An electric arc welder with a variable AC voltage input of up to 600 VAC and a rectifier to provide a DC link, a driven high frequency boost stage with first and second leads connected to said DC link, said boost stage comprising an inductor, a first series output branch with a first primary winding connected to said first lead and a first capacitor connected to said second lead, a second series output branch with a second primary winding connected to said second lead and a second capacitor connected to said first lead and a high frequency operated switch between said leads and having an opened condition charging said capacitors by current through said primary windings in a first direction and discharging said inductor and a closed condition charging said inductor through said primary windings by current in a second direction and discharging said inductor to charge said capacitors, said switch operated by a power factor control circuit at a frequency greater than about 18 kHz, said boost stage having an AC output stage comprising the secondary winding network of a transformer powered by current flow in said first and second primary windings, a rectifier for converting said AC output to a first DC voltage and an output converter for converting said first DC voltage to a second DC voltage connected across the arc of a welding station and having a controlled weld current or voltage.

2. An electric arc welder as defined in claim 1 with a diode poled in the direction from said first lead and second lead and in series between said first and second capacitors for clamping said capacitors together as they are charged to a controlled voltage.

3. An electric arc welder as defined in claim 2 wherein said switch has a rating of 30–75 amperes.

4. An electric arc welder as defined in claim 3 wherein said first DC voltage is in the controlled range of 75–113 VDC.

5. A welder as defined in claim 3 wherein said power factor control circuit includes a circuit to cause discontinuous current flow at the AC input.

6. A welder as defined in claim 3 wherein said power factor control circuit includes a circuit to cause continuous current flow at the AC input.

7. An electric arc welder as defined in claim 3 wherein said AC voltage input is three phase and greater than 220 VAC and said weld current and voltage create a power of over 3 kWatts.

8. An electric arc welder as defined in claim 2 wherein said first DC voltage is in the controlled range of 75–113 VDC.

9. An electric arc welder as defined in claim 2 wherein said output converter is a buck converter with a switch operated by a pulse width modulator.

10. An electric arc welder as defined in claim 9 wherein said pulse width modulator is controlled by a weld current feedback voltage.

11. An electric arc welder as defined in claim 9 wherein said pulse width modulator is controlled by a weld voltage feedback voltage.

12. An electric arc welder as defined in claim 9 wherein said pulse width modulator is operated at a frequency over 18 kHz.

13. A welder as defined in claim 2 wherein said power factor control circuit includes a circuit to cause discontinuous current flow at the AC input.

14. A welder as defined in claim 2 wherein said power factor control circuit includes a circuit to cause continuous current flow at the AC input.

15. An electric arc welder as defined in claim 2 wherein said AC voltage input is three phase and greater than 220 VAC and said weld current and voltage create a power of over 3 kWatts.

16. An electric arc welder as defined in claim 1 wherein said switch has a rating of 30–75 amperes.

17. An electric arc welder as defined in claim 16 wherein said first DC voltage is in the controlled range of 75–113 VDC.

18. An electric arc welder as defined in claim 16 wherein said output converter is a buck converter with a switch operated by a pulse width modulator.

19. An electric arc welder as defined in claim 18 wherein said pulse width modulator is controlled by a weld current feedback voltage.

20. An electric arc welder as defined in claim 18 wherein said pulse width modulator is controlled by a weld voltage feedback voltage.

21. An electric arc welder as defined in claim 18 wherein said pulse width modulator is operated at a frequency over 18 kHz.

22. A welder as defined in claim 16 wherein said power factor control circuit includes a circuit to cause discontinuous current flow at the AC input.

23. A welder as defined in claim 16 wherein said power factor control circuit includes a circuit to cause continuous current flow at the AC input.

24. An electric arc welder as defined in claim 16 wherein said AC voltage input is three phase and greater than 220 VAC and said weld current and voltage create a power of over 3 kWatts.

25. An electric arc welder as defined in claim 1 wherein said first DC voltage is in the controlled range of 75–113 VDC.

26. An electric arc welder as defined in claim 25 wherein said output converter is a buck converter with a switch operated by a pulse width modulator.

27. An electric arc welder as defined in claim 26 wherein said pulse width modulator is controlled by a weld current feedback voltage.

28. An electric arc welder as defined in claim 26 wherein said pulse width modulator is controlled by a weld voltage feedback voltage.

29. An electric arc welder as defined in claim 26 wherein said pulse width modulator is operated at a frequency over 18 kHz.

30. A welder as defined in claim 26 wherein said power factor control circuit includes a circuit to cause discontinuous current flow at the AC input.

31. A welder as defined in claim 26 wherein said power factor control circuit includes a circuit to cause continuous current flow at the AC input.

32. An electric arc welder as defined in claim 26 wherein said AC voltage input is three phase and greater than 220 VAC and said weld current and voltage create a power of over 3 kWatts.

33. A welder as defined in claim 25 wherein said power factor control circuit includes a circuit to cause discontinuous current flow at the AC input.

34. A welder as defined in claim 25 wherein said power factor control circuit includes a circuit to cause continuous current flow at the AC input.

35. An electric arc welder as defined in claim 25 wherein said AC voltage input is three phase and greater than 220 VAC and said weld current and voltage create a power of over 3 kWatts.

36. An electric arc welder as defined in claim 1 wherein said output converter is a buck converter with a switch operated by a pulse width modulator.

37. An electric arc welder as defined in claim 36 wherein said pulse width modulator is controlled by a weld current feedback voltage.

38. An electric arc welder as defined in claim 36 wherein said pulse width modulator is controlled by a weld voltage feedback voltage.

39. An electric arc welder as defined in claim 36 wherein said pulse width modulator is operated at a frequency over 18 kHz.

40. An electric arc welder as defined in claim 36 wherein said AC voltage input is three phase and greater than 220 VAC and said weld current and voltage create a power of over 3 kWatts.

41. A welder as defined in claim 1 wherein said power factor control circuit includes a circuit to cause discontinuous current flow at the AC input.

42. An electric arc welder as defined in claim 41 wherein said AC voltage input is three phase and greater than 226 VAC and said weld current and voltage create a power of over 3 kWatts.

43. A welder as defined in claim 1 wherein said power factor control circuit includes a circuit to cause continuous current flow at the AC input.

44. An electric arc welder as defined in claim 43 wherein said AC voltage input is three phase and greater than 220 VAC and said weld current and voltage create a power of over 3 kWatts.

45. An electric arc welder as defined in claim 1 wherein said AC voltage input is three phase and greater than 220 VAC and said weld current and voltage create a power of over 3 kWatts.

* * * * *